L. WIEGEL & J. LEHNBEUTER.
Improvement in Window-Sash Moldings.
No. 132,341.
Patented Oct. 15, 1872.
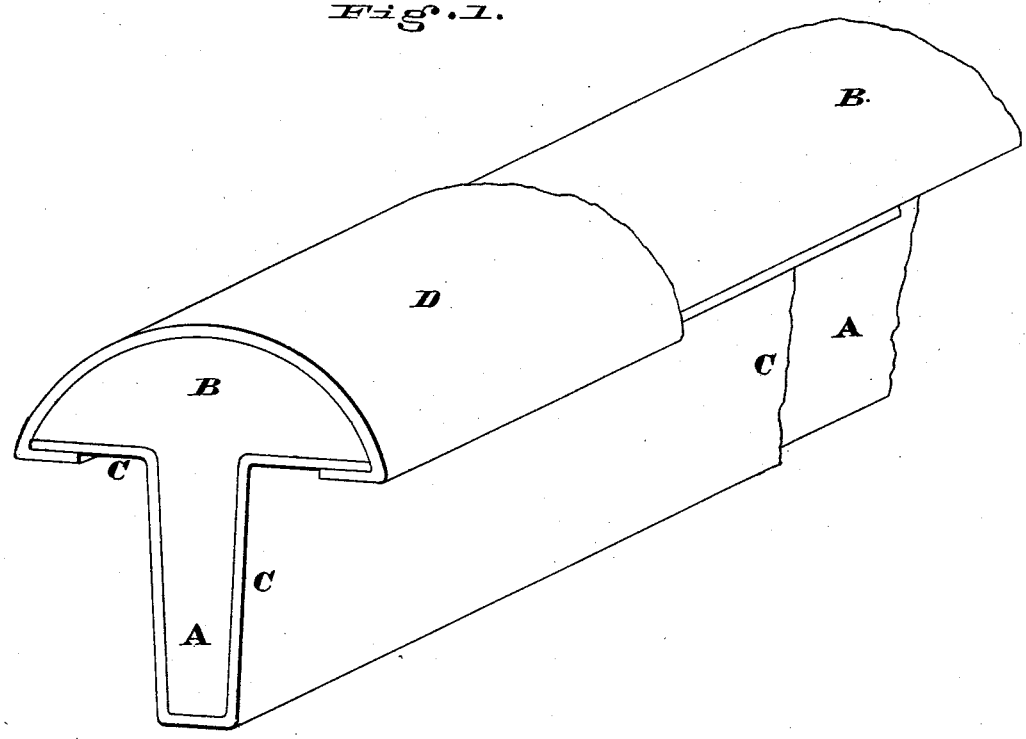
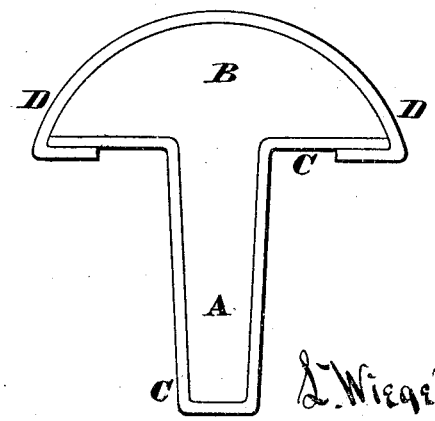

UNITED STATES PATENT OFFICE.

LAWRENCE WIEGEL AND JOSEPH LEHNBEUTER, OF CINCINNATI, OHIO.

IMPROVEMENT IN WINDOW-SASH MOLDINGS.

Specification forming part of Letters Patent No. 132,341, dated October 15, 1872.

*To all whom it may concern:*

Be it known that we, LAWRENCE WIEGEL and JOSEPH LEHNBEUTER, both of Cincinnati, Hamilton county, Ohio, have invented an Improved Manufacture of Sash-Moldings, of which the following is a specification:

Nature and Objects of the Invention.

The object of our invention is the production of a sash frame or molding for store fronts and ornamental windows which shall combine the external appearance and finish of metal with the specific lightness and freedom from thermic expansion and contraction to which a frame wholly metallic is subject, and by which many costly panes are now broken.

General Description.

Figure 1 represents, by perspective view, a piece of molding partially incased. Fig. 2 is a transverse section of the same.

A B is a strip of pine or other suitable wood having the form of the desired molding, A being the inner rib, and B the outer portion or molding proper. We first incase the rib A with sheet-brass C or other suitable sheet metal, said casing extending closely around the receding angle formed by the said parts A and B. We then inclose the molding proper B with another strip, D, of sheet-brass which has been first plated on its outer surface, and bring the edges of said strip around the salient angles of the said molding so as to firmly inclose the edges of the strip C. In practice these strips are bent nearly to shape and position by suitable upsetting machines, such as commonly employed by sheet-metal workers, and the incased molding is then finished by being drawn through a die. The two strips C and D may be additionally secured by soldering together of their lapping portions.

A sash whose moldings or stiles are all thus constructed obviously combines the cheapness, lightness, and freedom from sudden expansion and contraction under heat and cold inherent in wood, with all the advantages of a metallic finish.

Our stile or molding has several very decided advantages over the ordinary metallic stile—for example, it is not liable to crack the glass by expansion and contraction of its substance under changes of temperature, a casualty by which so many of the most costly lights are now destroyed. It is much lighter and cheaper and fully as ornamental.

Claim.

We claim as a new and useful article of manufacture—

A sash stile or molding composed of a wooden core or body, A B, incased in the two overlapping strips of sheet metal C D, as and for the purpose set forth.

In testimony of which invention we hereunto set our hands.

LAWRENCE WIEGEL.
JOSEPH LEHNBEUTER.

Attest:
GEO. H. KNIGHT,
JAMES H. LAYMAN.